3,047,516
WEAKLY BASIC ANION EXCHANGE RESINS

Charles A. Feldt, Naperville, and George T. Kekish, Chicago, Ill., assignors to Nalco Chemical Company, Chicago, Ill., a corporation of Delaware
No Drawing. Filed Apr. 22, 1960, Ser. No. 23,914
17 Claims. (Cl. 260—2.1)

This invention relates to ion exchange methods and to resinous polymerization products having marked and valuable properties of ion absorption, adsorption, or exchange, and to new and improved methods for preparing such products. In particular the invention is directed to weakly basic anion exchange resins.

Ion exchange materials are well known in the art. Such materials have the ability to exchange ions between a solid and liquid without substantially altering the physical structure of the solid. Ion exchange resins have been used extensively for removing electrolytes from water in operations known as desalting, demineralization, or deionization. Ion exchange processes are also used in the pharmaceutical, food processing, electroplating, petroleum and waste treatment industries, as well as in the field of medicine for removal of undesired components of liquid or for other purposes.

Early development in the field of ion exchange was limited to non-porous minerals where the exchange of ions occurred on crystal surfaces. The use of such minerals is accompanied by the disadvantage that they must be very finely ground in order to provide any practical degree of availability of surface area for ion exchange. Later development included the use of porous materials in which the exchange of ions occurs throughout the entire ion exchange particle. Earlier known porous materials included inorganics such as kaolinite and apatites, each of which exhibit anion exchange capabilities. Porous anion exchange materials of more recent interest include synthetic organic resins. Synthetic anion exchange resins are conventionally divided into two categories. They are: strong base resins and weak base resins.

Weak base resins have little or no salt splitting capacity. They are highly ionized only when in salt form, and have ion exchange activity only with media below pH 7. Their principal use is to remove acids from aqueous solution.

Polyamine derivatives of crosslinked polystyrenes have been found to be effective weakly basic anion exchange resins. These materials may be graphically described as having a hydrophobic crosslinked polystyrene "backbone" with hydrophilic amine groups which hang or trail therefrom when the materials are placed in an aqueous liquid. The amine groups account for ion exchange activity. Although the polystyrene itself is very stable, the trailing amine groups are relatively unstable and may be degraded by oxidation. This occurs most readily in the case of trailing primary amines, which are most reactive, and to lesser but still significant extent with trailing secondary and tertiary amines, the latter being most stable. Of course, deterioration of the trailing amine results in loss of ion exchange activity, and consequent limited commercial usefulness of an ion exchange resin in which this occurs readily.

It is believed that in the newly invented resins described herein, crosslinking occurs through the nitrogen atoms of a polymeric material reacted with an ammonia-epihalohydrin copolymer. Such a resin maintains its capacity for longer periods of time than the above described polystyrene resin with "trailing" tertiary amine groups when the two types of resins are respectively subjected to the same degrading conditions.

Anion exchange resins, in order to be satisfactory commercially, must also be substantially insoluble in water, and must be resistant to physical deterioration such as swelling or shattering while at the same time having a high porosity and correspondingly high operating capacity. It has been noted that resins which are highly porous and have a high capacity also tend to be soft and susceptible to substantial swelling, when changing from the regenerated to the exhausted form. Weakly basic anion exchange resins swell from the regenerated to the exhausted form while strongly basic anion exchange resins swell from the exhausted to the regenerated form. The percent of swelling depends on a variety of properties such as cross-linking, capacity, and method of preparation. Softness is coupled with a tendency to crumbling. High swelling leads to various engineering problems with respect to the design of the equipment used to provide contact of liquid fluids with exchange resin in commercial systems. A relatively hard highly crosslinked resin, which is resistant to swelling and crumbling, correspondingly tends to lack porosity and consequently has a relatively low operating capacity.

We have found that weakly basic anion exchange resins prepared according to the invention do not swell from regenerated to exhausted state due to the apparent formation of strongly basic quaternary nitrogen groups in the reaction product of our novel and inventive process.

It is therefore an object of the present invention to provide a weakly basic anion ion exchange resin which has more stability than polystyrene-polyamine resins in the presence of oxidizing agents.

Another object is to provide a weakly basic resin which has a high operating capacity and porosity, coupled with excellent resistance to swelling and crumbling, exhibiting little or no swelling from regenerated to exhausted form.

Another object is to provide a weakly basic anion resin having 50–100% more operating capacity than resins synthesized using economically attractive starting materials such as epichlorohydrin and ammonia, and prepared without the inclusion of additional polymeric reactants.

Another object of the invention is to provide a method of preparing and a method of using such improved anion exchange resins. Still another object is to provide anion exchange resins which having excellent operating capacity, are also capable of being regenerated without difficulty.

A further object is to provide an improved weak base anion resin bead and method of preparing same.

Other objects will appear from the following detailed description of the invention.

In general it has been found that excellent anion resins may be made by blending and reacting polymers of nitrogen heterocyclic vinyl compounds with condensation copolymers of ammonia and epihalohydrin. The polymerized nitrogen heterocycle may be selected from polymerized basic 5 or 6 membered ring structures containing 1–4 nitrogen atoms.

Particularly it has been found that anion exchange resins made by blending and/or reacting polymerized vinylimidazole with copolymers of ammonia and epihalohydrin, have satisfactory oxygen stability coupled with low shrinkage and resistance to physical degradation.

More particularly, highly satisfactory resinous terpolymers may be prepared by blending and reacting poly N-vinylimidazole in a weight ratio of 1:99 to 30:70 parts by weight of polyvinylimidazole to copolymer, with ammonia-epichlorohydrin copolymer prepared using reactants in a molar ratio of from about 1 to 4 mols of ammonia to each mol of epichlorohydrin. A preferred weight ratio of polyvinylimidazole to ammonia-epichlorohydrin copolymer is 9:91. A preferred molar ratio of ammonia to epichlorohydrin in the copolymer itself is 1.7:1. It has also been discovered that superior weak base terpolymeric resin beads can be produced by adding the ammonia-epichlorohydrin-polyvinyl imidazole blend to a hydrocarbon system with vigorous agitation in the presence of a dispersing agent, at temperatures of from 20 to 120° C., and in the further presence of added epihalohydrin. This system may be referred to as suspension polymerization. In preparing the copolymer, it is preferred to add the epichlorohydrin to the ammonia solution. This solution is made most conveniently by adding ammonia to water in the amount of 28% to the saturation point of 32% by weight of ammonia. The addition of epichlorohydrin to the ammonia solution should preferably be carried out dropwise over a period of from 2 to 3 hours while maintaining a temperature in the range of 40 to 60° C. Ordinarily, rapid additions of the epichlorohydrin to the ammonia solution result in a difficult temperature control problem since the reaction is exothermic. This problem may be obviated of course, by conducting the reaction in a pressure vessel. Use of a pressure system has the further advantage of shortening reaction time. At the end of the addition, the product is a clear polymeric liquid. At room temperature this liquid sets up into a gel in about 1 hour. To efficiently accomplish blending, the polyvinylimidazole is dissolved in water to make a solution of approximately 10%. The ammonia-epichlorohydrin polymer is then mixed with the water solution of polyvinylimidazole, preferably while the said copolymer is still in its liquid state. Blending may be completed by agitation of the polyvinylimidazole with copolymer at temperatures of from 20° C. to 120° C. for a period of from 15 to 30 minutes.

If it is desired to provide the resin in bead form, the blended liquid may be suspension polymerized by placing in a dispersion medium preferably consisting essentially of toluene containing a detergent type dispersing agent at a temperature of from 20° C. to 120° C. Vigorous agitation should be maintained for a period of from 15 minutes to 5 hours. The resultant beads may be separated from the dispersion by filtering, subsequent to which they may be air dried.

It has further been discovered that the formation of a bead having highly desirable physical properties is enhanced by the addition to the dispersion medium of epichlorohydrin in a weight ratio of from 1:99 to 20:80 parts by weight of epichlorohydrin to the blended resinous mixture, a preferred ratio being 8:92. The addition should be accompanied by agitation at low temperatures, preferably around room temperature. Subsequent to the addition of epichlorohydrin, agitation is continued and the system is heated for a period of from 3 to 5 hours to a temperature of from 100 to 120° C. At the end of this time, the system is cooled, and the beads are filtered from the dispersion media and air dried. In conducting the above detailed copolymerization of ammonia and epichlorohydrin it is essential that the mol ratio of ammonia to epichlorohydrin be maintained between about 1:1–4:1. It is also essential that the ammonia be dissolved in water rather than being in its gaseous state.

Preferred ranges of materials to be used in preparing the resins of the instant invention are as follows:

In the preparation of ammonia-epichlorohydrin copolymer, a preferred weight ratio range of reactants is 1.5:1 to 2:1 parts by weight of ammonia to epichlorohydrin. In the preparation of the blended resin, weight ratios of 5:95 to 15:85 parts by weight of polyvinylimidazole to ammonia-epichlorohydrin copolymer, are the preferred range. In the final production of beads, the preferred weight ratio range of parts by weight of epichlorohydrin to blended resin is 5:95 to 10:90.

The resins of this invention include such copolymers and terpolymers as may be prepared by a procedure similar to that outlined above, with the substitution of a glycerol α-monohalohydrin (hydrolysis product of an epihalohydrin) for the epichlorohydrin reactant. Other resins which may be used instead of the polyvinylimidazole in preparing the terpolymer, include polymers prepared from 2-vinylimidazole, 2-vinyl pyridine, 4-vinyl pyridine, N-vinyl imidazoline, N-vinyl triazole and N-vinyl tetrazole.

The following examples illustrate the invention, but the invention is not limited to these examples.

*Example I*

This example illustrates the preparation of granules of an ammonia-epichlorohydrin-polyvinylimidazole terpolymer. One (1) mol of epichlorohydrin was added dropwise with stirring to 1.7 mols of $NH_3$ as an aqueous solution in a 500 ml. flask. An exothermic reaction took place and was continued over a period of about one hour and a half. The temperature of the reaction was not allowed to exceed about 50° C. Upon cooling to room temperature, 150 weight parts of the epichlorohydrin ammonia copolymer in its liquid form were blended by vigorous stirring with 40 weight parts of a 25% aqueous solution of poly-N-vinylimidazole. Upon standing the mixture set to a gel, which was dried and then crushed into small pieces. The pieces were washed with water on a 50 mesh screen.

*Example II*

This example illustrates the preparation of beads of an ammonia-epichlorohydrin-polyvinylimidazole terpolymer. 1.7 mols of a 28% aqueous solution of $NH_3$ were placed in a 500 ml. flask after which 1 mol of epichlorohydrin was added dropwise with stirring over a period of about an hour and a half. An exothermic reaction took place. The temperature of the reaction was not allowed to exceed about 50° C. Upon cooling to room temperature, 150 weight parts of the epichlorohydrin-ammonia liquid polymer were blended with 40 weight parts of a 25% aqueous solution of poly-N-vinylimidazole.

635 ml. of toluene and 4.25 grams of "Ethomid 0/15," a non ionic detergent type of dispersant, were placed in a 1 liter flask which was equipped with a stirrer, condenser, thermometer, Y-tube and a Dean and Stark water trap. 190 grams of the polymeric liquid blend prepared as described above, were then added to the flask with vigorous stirring. After 5 minutes, 10 grams of epichlorohydrin was added to the mixture at room temperature, whereupon the mixture was heated to a temperature of from 85 to 110° C. to reflux the material. Refluxing and mixing was carried on for a period of about 5 hours. The speed of stirring was adjusted to obtain the desired size of beads. Water was azeotropically removed from the mixture by means of the water trap. At the end of said 5 hours, the mixture was cooled and the beads were filtered from the dispersion medium. Yellowish conglomerate beads were obtained by the process.

*Example III*

This is another example of the preparation of beads of an ammonia-epichlorohydrin-polyvinylimidazole terpolymer. The preparation of an ammonia-epichlorohydrin copolymer was repeated using the same procedure described in the preceding example. Then in this instance, 193 grams of the epichlorohydrin ammonia liquid polymer were blended with 92.4 grams of a 10% aqueous solution of poly-N-vinylimidazole. Beads were prepared using a 2 liter flask, equipped with a stirrer, condenser, thermometer, Y-tube and a Dean and Stark water trap. 900 ml. of toluene and 9 weight parts of "Ethomid 0/15" were placed therein. To this mixture was added 285.4 weight parts of the above polymeric liquid blend. Stirring was commenced at the time of addition. After 5 minutes, 10 grams of epichlorohydrin was added to the mixture at room temperature and the heater was turned on and the mixture was heated to a temperature of 110° C. to reflux the material. The polymeric liquid gelled in bead form after continuation of the mixing and refluxing for a period of about 4 hours. The mixture was thereupon cooled and the beads were separated from the dispersion medium by filtering and air drying. Yellowish discrete beads were obtained, and these were able to be screened through screens of from 12 to 50 mesh.

*Example IV*

The procedure of the preceding example was repeated with the exception that the blend of epichlorohydrin-ammonia copolymer with polyvinylimidazole was adjusted to contain 9.84% of polyvinylimidazole.

Samples of the granules and beads obtained in each of the above recited examples were respectively placed in a column having a ¾ inch diameter, in amount such that there was a 3 inch height of resin in the column. Oxidation stability was then determined by passing 180° F. water through the column at a rate of 140-150 ml. per minute flow rate, for a period of 3 weeks. Each sample of resin was observed to have substantially the same physical properties after the oxidation tests as it had at the outset of the test. This was taken to be indicative of satisfactory oxidation stability.

In addition to being satisfactorily stable in the presence of oxidizing agents, the subject anion exchange resins have other desirable characteristics. The following table sets forth the water holding capacity, total capacity, operating capacity, and other properties of these resins. A comparison of the beads made using the procedure in the above recited examples was made with a resin prepared by means of a simple copolymerization of epichlorohydrin and ammonia without blending with polyvinylimidazole. The preparation of such a resin is detailed in copending U.S. application Serial No. 847,109, filed October 19, 1959, by one of the inventors in this case. Such a resin is considered to have very satisfactory capacity, and to be highly desirable from that standpoint, but to have somewhat less than desirable expansion or swelling characteristics. The simple copolymer is designated in the table as "Epi-$NH_3$." The terpolymeric resin composed of a copolymer of epichlorohydrin and ammonia interreactively blended with polyvinylimidazole is designated as "Epi-$NH_3$-PVI."

heterocyclic material is a polymeric amine having the general formula:

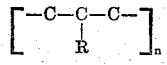

wherein R represents a tertiary amine, and could include N-basic monomers polymerized either by themselves or with a different N-basic monomer. Such materials might further include any polymer containing a tertiary nitrogen in the polymer chain, at the end of the chain, or depending from the chain.

The invention is hereby claimed as follows:

1. A weakly basic water insoluble anion exchange resin comprising the condensation terpolymer formed as the reaction product of an addition polymer of a nitrogen heterocyclic vinyl compound, and a condensation copolymer of ammonia and a compound selected from the group consisting of epihalohydrins and glycerol α-monohalohydrins, said copolymer being the reaction product of aqueous ammonia to halohydrin in a molar ratio of from 1:1 to 4:1.

2. A weakly basic water insoluble anion exchange resin comprising the condensation terpolymer formed as the reaction product of an addition polymer of a nitrogen heterocyclic vinyl compound, and a condensation copolymer of ammonia and a compound selected from the group consisting of epihalohydrins and glycerol α-monohalohydrins, when the reaction is carried out by suspension polymerization in the presence of a compound selected from the group consisting of epihalohydrins and glycerol α-monohalohydrins, said copolymer being the reaction product of aqueous ammonia to halohydrin in a molar ratio of from 1:1 to 4:1.

3. A weakly basic water insoluble anion exchange resin comprising a condensation terpolymer formed as the reaction product of polyvinylimidazole with a condensation copolymer of ammonia and epichlorohydrin, said copolymer being the reaction product of aqueous ammonia to epichlorohydrin in a molar ratio of from 1:1 to 4:1.

|  | WHC [1] | Total meq./g. | Capacity meq./ml. | Column Test Operating Capacity kgr./cu. ft. | SSC [2] | | Percent Expansion [3] |
|---|---|---|---|---|---|---|---|
|  |  |  |  |  | meq./g. | meq./ml. |  |
| Epi-$NH_3$ | 68.2 | 11.6 | 2.06 | 24.8 | 0.5 | 0.1 | 39.9 |
| Epi-$NH_3$-PVI, Example II, Beads | 57.3 | 10.3 | 2.85 | 39.5 | 1.2 | .33 | 3.0 |
| Epi-$NH_3$-PVI, Example III, Beads | 56.5 | 10.0 | 2.63 | 48.5 | 1.03 | .27 | 13.0 |
| Epi-$NH_3$-PVI, Example III, Type Beads | 58.1 | 9.58 | 2.52 | 38.0 | 1.02 | .26 | 11.2 |
| Epi-$NH_3$-PVI, Example IV, Beads | 58.4 | 10.03 | 2.53 | 40.6 | 1.38 | .35 | 10.7 |
| Epi-$NH_3$-PVI, Example IV, Type Beads | 56.6 | 9.68 | 2.51 | 37.7 | 1.38 | .37 | 10.9 |

[1] Water holding capacity.
[2] Salt splitting capacity.
[3] Percent expansion of resin in use as it changes from free amine form to hydrochloride salt form.

Each of the above enumerated tests is conducted after one elution of the resin tested. Beads referred to by "type" in the table, are those obtained by re-runs of the preparation outlined in the designated example.

As apparent from the above collected data, the newly invented resins have a high water holding capacity as well as operating capacity as high as almost two times that of a resin not derived from reaction of a polymerized nitrogen heterocycle. The excellent capacity characteristics of the new resins are coupled with relatively low expansion properties.

Although the specific examples of resins of the instant invention are limited to those preferred materials prepared by reacting polymeric nitrogen heterocycles, it is believed that successful ion exchange resins may be prepared using other nitrogen containing reactants which provide a "trailing" nitrogen atom available for acting as a crosslink between polymeric reactants used to form the exchange material. An example of such a non- 4. A weakly basic water insoluble anion exchange resin comprising a condensation terpolymer formed as the reaction product of polyvinylimidazole with a condensation copolymer of ammonia and epichlorohydrin, when the reaction is carried out by suspension polymerization in the presence of epichlorohydrin, said copolymer being the reaction product of aqueous ammonia to epichlorohydrin in a molar ratio of from 1:1 to 4:1.

5. A weakly basic water insoluble anion exchange resin comprising a condensation terpolymer formed as the reaction product of polyvinylimidazole, and a condensation copolymer of ammonia and epichlorohydrin reacted with each other in a ratio of parts by weight of from 1:99 to 30:70, the copolymer being the reaction product of aqueous ammonia to epichlorohydrin in a molar ratio of from 1:1 to 4:1.

6. A weakly basic water insoluble anion exchange resin comprising a condensation terpolymer formed as the reaction product of polyvinylimidazole, and a condensation copolymer of ammonia and epichlorohydrin reacted with each other in a ratio of parts by weight of from 1:99 to 30:70, the copolymer being the reaction product of aqueous ammonia to epichlorohydrin in a molar ratio of from 1:1 to 4:1, where the reaction is carried out by suspension polymerization in the presence of epichlorohydrin of 1:99 to 20:80 parts by weight of epichlorohydrin to terpolymeric resin.

7. The composition of matter of claim 2 in the form of beads.

8. The composition of matter of claim 4 in the form of beads.

9. The composition of matter of claim 6 in the form of beads.

10. A method of treating liquids to remove anions of dissolved electrolytes which comprises contacting said liquids with particles of weakly basic water insoluble anion exchange resins, said resins being formed as the reaction product of an addition polymer of a nitrogen heterocyclic vinyl compound, and a condensation copolymer of ammonia and a compound selected from the group consisting of epihalohydrins and glycerol α-monohalohydrins, said copolymer being the reaction product of aqueous ammonia to halohydrin in a molar ratio of from 1:1 to 4:1.

11. A method of treating liquids to remove anions of dissolved electrolytes which comprises contacting said liquids with particles of weakly basic water insoluble anion exchange resins, said resins being formed as a reaction product of an addition polymer of a nitrogen heterocyclic vinyl compound, and a condensation copolymer of ammonia and a compound selected from the group consisting of epihalohydrins and glycerol α-monohalohydrins, said reaction having been carried out by suspension polymerization in the presence of a compound selected from the group consisting of epihalohydrins and glycerol α-monohalohydrins, said copolymer being the reaction product of aqueous ammonia to halohydrin in a molar ratio of from 1:1 to 4:1.

12. A method of treating liquid to remove anions of dissolved electrolytes which comprises contacting said liquid with particles of weakly basic water insoluble anion exchange resin, said resin being formed as a reaction product of polyvinylimidazole with a condensation copolymer of ammonia and epichlorohydrin, said copolymer being the reaction product of aqueous ammonia to epichlorohydrin in a molar ratio of from 1:1 to 4:1.

13. A method of treating liquid to remove anions of dissolved electrolytes which comprises contacting the solution with particles of weakly basic water insoluble anion exchange resin, said resin being formed as a reaction product of polyvinylimidazole with a condensation copolymer of ammonia and epichlorohydrin, said reaction being carried out by suspension polymerization in the presence of epichlorohydrin, said copolymer being the reaction product of aqueous ammonia to epichlorohydrin in a molar ratio of from 1:1 to 4:1.

14. A process of forming particles of a water insoluble terpolymeric weakly basic anion exchange resin which comprises the steps of reacting a polymerized nitrogen heterocyclic vinyl compound, and a condensation copolymer of ammonia and a compound selected from the group consisting of epihalohydrins and glycerol α-monohalohydrins, by suspension polymerization in the presence of a compound selected from the group consisting of epihalohydrins and glycerol α-monohalohydrins, said copolymer being the reaction product of aqueous ammonia to halohydrin in a molar ratio of from 1:1 to 4:1, collecting the material which has been suspension polymerized, upon a filter, and air drying the collected material.

15. The process conducted according to claim 14 wherein the said reaction is conducted by placing said polymerized heterocyclic compound in aqueous solution, blending said aqueous solution with said condensation copolymer, and carrying out said suspension polymerization by agitating the blended materials in a non-water miscible suspension medium containing said compounds selected from the group consisting of epihalohydrins and glycerol α-monohalohydrins, whereby suspension of particles of said blended materials results, so that the particles may be contacted by said contents of the suspension medium, to cause alkylation and crosslinking.

16. The process conducted according to claim 15, wherein the said condensation copolymer is formed by adding said compound selected from the group consisting of epihalohydrins and glycerol α-monohalohydrins to ammonia dropwise, at a temperature of from 20–95° C.

17. The process conducted according to claim 15, wherein said suspension medium comprises toluene.

References Cited in the file of this patent

UNITED STATES PATENTS 2,104,092 Munz _____ Jan. 4, 1938